US007785686B2

(12) United States Patent
Fukui et al.

(10) Patent No.: US 7,785,686 B2
(45) Date of Patent: Aug. 31, 2010

(54) MOLDING

(75) Inventors: Katsuhisa Fukui, Fujisawa (JP); Tatsuya Kaneko, Tokyo (JP)

(73) Assignee: Newfrey LLC, Newark, DE (US)

( * ) Notice: Subject to any disclaimer, the term of this patent is extended or adjusted under 35 U.S.C. 154(b) by 409 days.

(21) Appl. No.: 11/877,026

(22) Filed: Oct. 23, 2007

(65) Prior Publication Data
US 2008/0095957 A1    Apr. 24, 2008

(30) Foreign Application Priority Data
Oct. 24, 2006  (JP) .............................. 2006-288968

(51) Int. Cl.
*B60R 13/04* (2006.01)
(52) U.S. Cl. .................... 428/57; 428/128; 428/154; 428/155
(58) Field of Classification Search .................. 428/57, 428/31; 296/1.08; 52/716.5–716.7; 293/128, 293/154, 155
See application file for complete search history.

(56) References Cited

U.S. PATENT DOCUMENTS 7,407,205 B2 * 8/2008 Nakao et al. ................ 293/128

FOREIGN PATENT DOCUMENTS

| EP | 1 176 070 | 1/2002 |
| EP | 1 652 710 | 5/2006 |
| EP | 1 795 399 | 6/2007 |
| JP | 62-055221 | 3/1987 |
| JP | 62-194956 | 8/1987 |
| JP | 09099787 | 1/1997 |
| JP | 11-034757 | 2/1999 |
| JP | 2003-118384 | 4/2003 |
| JP | 2005-035472 | 2/2005 |
| WO | WO2006/038307 A1 * | 4/2006 |

OTHER PUBLICATIONS

Great Britain Search Report for GB 0720740.0 dated Jan. 21, 2008, 2 pages.

* cited by examiner

*Primary Examiner*—Alexander Thomas
(74) *Attorney, Agent, or Firm*—Harness, Dickey & Pierce, P.L.C.

(57) ABSTRACT

A molding for a vehicle eliminates the need for equipment and reduces assembly time. An end cap has an end cap main unit inserted into the inner space from an opening in a molding main unit end surface, a catch portion (engaging portion) to engage and disengage from a molding main unit curved portion (engaged portion). The base end portion is rotatably installed in the end cap main unit and the rotating end portion side is inserted into the inner space from the opening in the molding main unit end surface. An end cap movable portion on which a second protrusion is formed contacts a first protrusion in the molding main unit to prevent movement in the direction removing the end cap from the opening in the molding main unit by making contact with the first protrusion when the catch portion has engaged the curved portion.

15 Claims, 4 Drawing Sheets

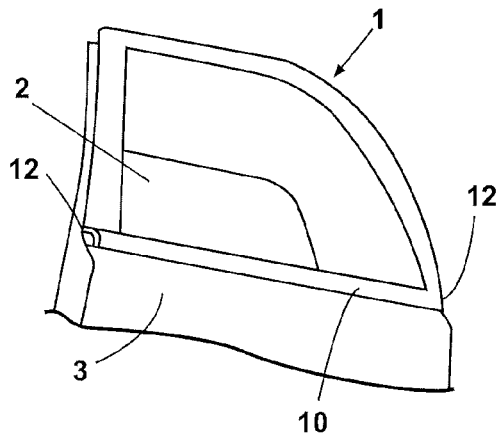
Fig. 7 (PRIOR ART)
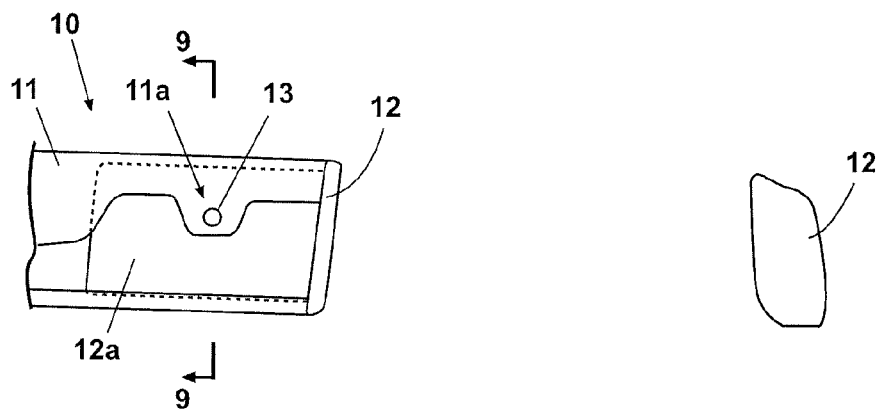
Fig. 8A (PRIOR ART)  Fig. 8B (PRIOR ART)
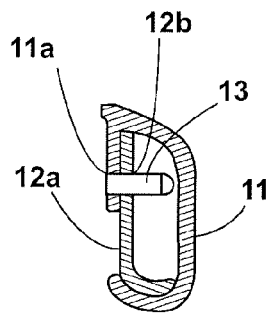
Fig. 9 (PRIOR ART)

MOLDING

CROSS-REFERENCE TO RELATED APPLICATIONS

This application is a continuation of Japanese Application No. 2006-288968, filed Oct. 24, 2006. The disclosure of the above application is incorporated herein by reference.

FIELD

The present disclosure relates to a molding installed in the roof drip or belt line of an automobile consisting of a molding main unit in which an opening is molded in the end surface and an end cap inserted into the inner space from the opening in the end surface of the molding main unit to cover the end surface of the molding main unit.

BACKGROUND

The following is an explanation of a molding of the prior art using a belt line molding installed in the belt line as the example. As shown in FIG. 7, a window is installed in the door 1 of an automobile. The door glass 2 is installed between a door outer panel 3 and a door inner panel (not shown) allowing the door glass to be raised and lowered. A belt line molding 10 is installed at the upper edge (belt line) of the door outer panel 3 at the bottom end of the window opening. The belt line molding 10 is molded using resin extrusion molding. If necessary, some metal plate components can be used as insert components or decorative components.

FIG. 8(A) shows the portion adjacent to the end of the resin extrusion-molded belt line molding 10 as viewed from the door outer panel attachment side, and FIG. 8(B) is a side view from the end cap side. FIG. 9 is a cross-sectional view of FIG. 8(A) from 9-9. A fitting portion 12a on the end cap 12 is inserted from the opening in the end surface of the molding main unit 11 of the belt line molding 10. Assembly holes are opened using a drill from the molding main unit 11 side in the main unit side 11a and the end cap side 12b so that there is no gap between the molding main unit 11 and the end cap 12.

A resin pin 13 extrusion-molded at the same time as the end cap 12 is cut from the end cap 12, and the resin pin 13 is inserted into the assembly holes 11a, 12b to keep the end cap 12 from coming off the molding main unit 11.

In the belt line molding 10 in FIG. 7 through FIG. 9, the process employed to keep the end cap 12 from coming off the molding main unit 11 requires a step in which assembly holes 11a, 12b are opened up, and a step in which a resin pin 13 is inserted into these assembly holes 11a, 12b.

Thus, equipment is needed to open the hole in the molding main unit 11 and the end cap 12, and equipment is needed to insert the resin pin. The prior art also requires a great amount of assembly time.

SUMMARY

In light of this situation, the purpose of the present invention is to provide a molding designed to eliminate the need for equipment and to reduce assembly time. A molding comprises a molding main unit in which an opening has been molded in an end surface, and an end cap inserted into the inner space from the opening in the end surface of the molding main unit, wherein a first stopper portion and an engaged portion are installed in the inner space of the molding main unit, and wherein the end cap comprises an end cap main unit inserted into the inner space from an opening in the end surface of the molding main unit, an engaging portion able to engage and disengage from the engaged portion of the molding main unit with the base end portion rotatably installed in the end cap main unit and the rotating end portion side inserted into the inner space from the opening in the end surface of the molding main unit, and an end cap movable portion on which a second stopper portion has been formed to prevent movement in the direction removing the end cap from the opening in the molding main unit by making contact with the first stopper portion when the engaging portion has engaged the engaged portion.

The end cap main unit is inserted into the inner space from the opening in the molding main unit without the engaging portion in the end cap movable portion of the end cap engaging the engaged portion in the molding main unit. Once the engaging portion in the end cap movable portion has engaged the engaged portion of the molding main unit, the first stopper portion and the second stopper portion can come into contact with each other.

When the end cap moves in the direction pulling it apart from the molding main unit, the first stopper portion and the second stopper portion come into contact with each other, and the end cap is kept from moving any further in the direction pulling it apart from the molding main unit.

Among the first stopper portion and the second stopper portion an inclined surface is formed on at least one of the stopper portions to press against the other stopper portion, and wherein the inclined surface generates a component of force pulling the end cap into the inner space of the molding when the end cap is inserted from the opening in the molding main unit, the engaging portion of the end cap movable portion is rotated in the direction engaging the engaged portion of the molding main unit, and the second stopper portion is pushed into the first stopper portion.

The inclined surface generates a component of force pulling the end cap into the inner space of the molding when the end cap is inserted from the opening in the molding main unit, the engaging portion of the end cap movable portion is rotated in the direction engaging the engaged portion of the molding main unit, and the second stopper portion comes into contact with the first stopper portion.

A cover portion has a shape able to cover the opening in the molding main unit and makes contact with the end surface of the molding main unit is formed in the end cap. The cover portion comes into contact with the end surface of the molding main unit to keep the end cap from being inserted any further into inner space in the molding main unit. The second stopper portion and the engaging portion in the end cap and movable portion of the end cap are formed integrally.

In the invention described, the molding comprises a molding main unit in which an opening has been molded in an end surface, and an end cap inserted into the inner space from the opening in the end surface of the molding main unit, a first stopper portion and an engaged portion are installed in the inner space of the molding main unit, and the end cap comprises an end cap main unit inserted into the inner space from an opening in the end surface of the molding main unit, an engaging portion able to engage and disengage from the engaged portion of the molding main unit with the base end portion rotatably installed in the end cap main unit and the rotating end portion side inserted into the inner space from the opening in the end surface of the molding main unit, and an end cap movable portion on which a second stopper portion has been formed to prevent movement in the direction removing the end cap from the opening in the molding main unit by making contact with the first stopper portion when the engaging portion has engaged the engaged portion. Here, the end cap main unit can be inserted into the inner space from the opening in the molding main unit without the engaging portion on the end cap movable portion of the end cap engaging the engaged portion of the molding main unit, and the end cap can be kept from pulling out of the molding main unit by engaging the engaging portion in the end cap movable portion with the engaged portion in the molding main unit.

In the invention, among the first stopper portion and the second stopper portion an inclined surface is formed on at least one of the stopper portions to press against the other stopper portion, and the inclined surface generates a component of force pulling the end cap into the inner space of the molding when the end cap is inserted from the opening in the molding main unit, the engaging portion of the end cap movable portion is rotated in the direction engaging the engaged portion of the molding main unit, and the second stopper portion is pushed into the first stopper portion. Thus, the end cap can be pulled into the inner space of the molding main unit simply by inserting the end cap main unit from the opening in the molding main unit and rotating the engaging portion of the end cap movable portion in the direction engaging the engaged portion of the end cap main unit.

In the invention described, a cover portion with a shape able to cover the opening in the molding main unit and make contact with the end surface of the molding main unit is formed in the end cap. This keeps the end cap from being inserted any further into the inner space of the molding main unit. The second stopper portion on the end cap comes into contact with the first stopper portion on the molding main unit to position the end cap in the extraction direction from the molding main unit. The cover portion of the end cap coming into contact with the end surface of the molding main unit positions the end cap in the insertion direction into the molding main unit. These components position the end cap lengthwise with respect to the molding main unit.

In the invention described, the second stopper portion and the engaging portion in the end cap movable portion of the end cap are formed integrally. This can reduce end cap manufacturing costs

DRAWINGS

The drawings described herein are for illustration purposes only and are not intended to limit the scope of the present disclosure in any way.

FIG. 7 is a diagram used to explain belt line molding;

FIG. 8A-8B are a rear view of FIG. 7 in which the portion adjacent to the end of the belt line molding is viewed from the door outer panel attachment side, and (b) a view of (a) from the right side; and FIG. 9 is a cross-sectional view of FIG. 8 (a) from section 9-9.

DETAILED DESCRIPTION

Figure 1:
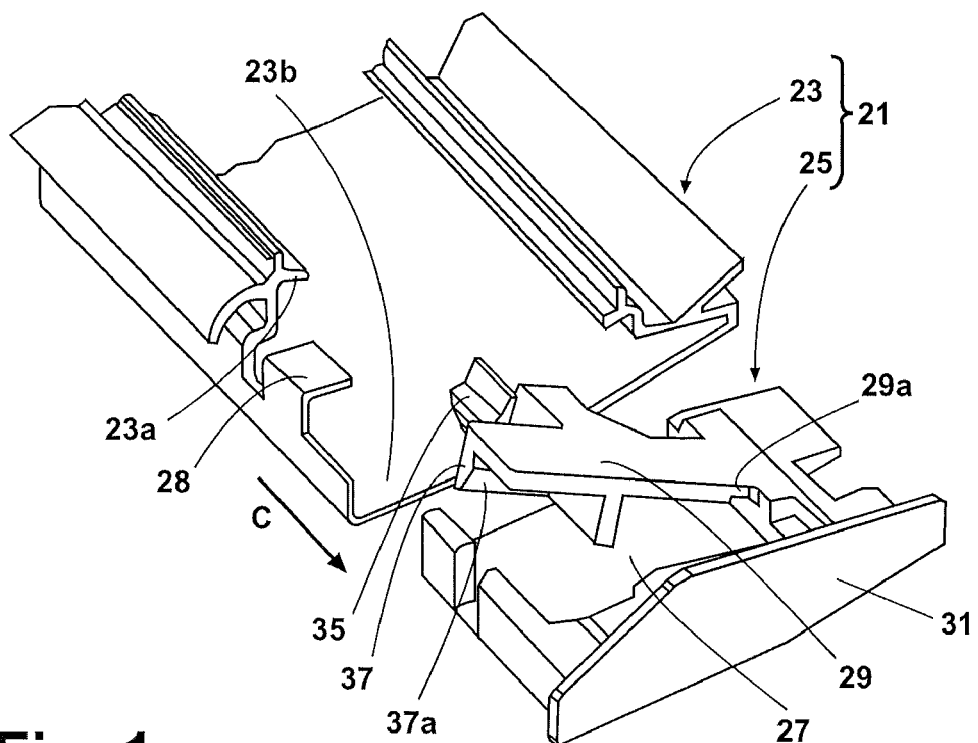
FIG. 1 is a diagram of the overall configuration of the molding in which the end cap has not been assembled in the molding main unit.
Figure 2:
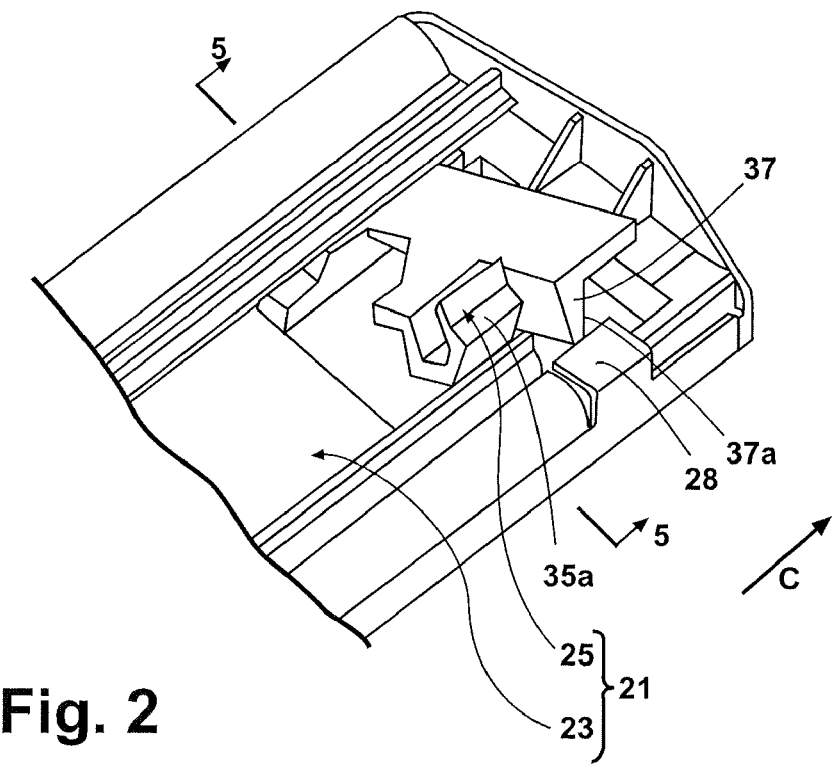
FIG. 2 is the diagram in FIG. 1 after the end cap main unit of the end cap has been inserted into the inner space of the molding main unit.
Figure 3:
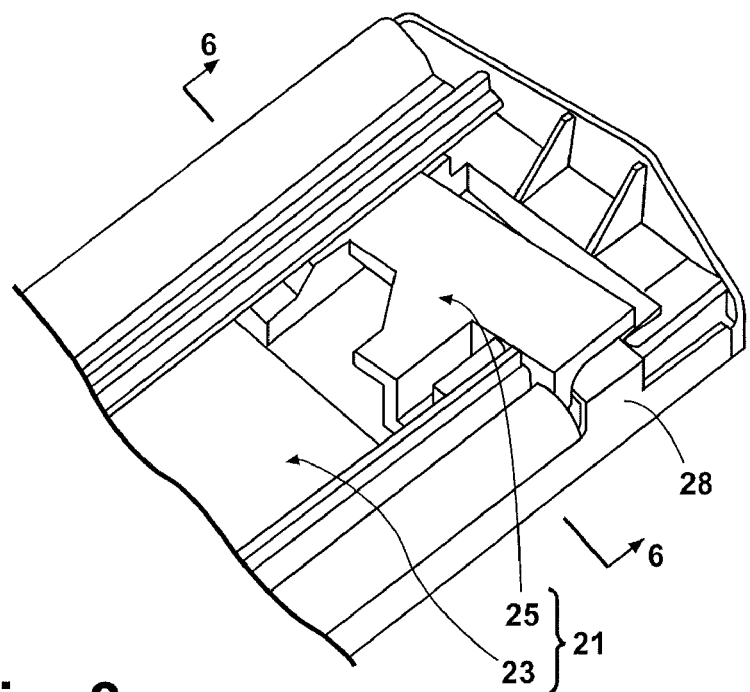
FIG. 3 is the diagram in FIG. 2 after the engaging portion of the end cap movable portion.
Figure 4:
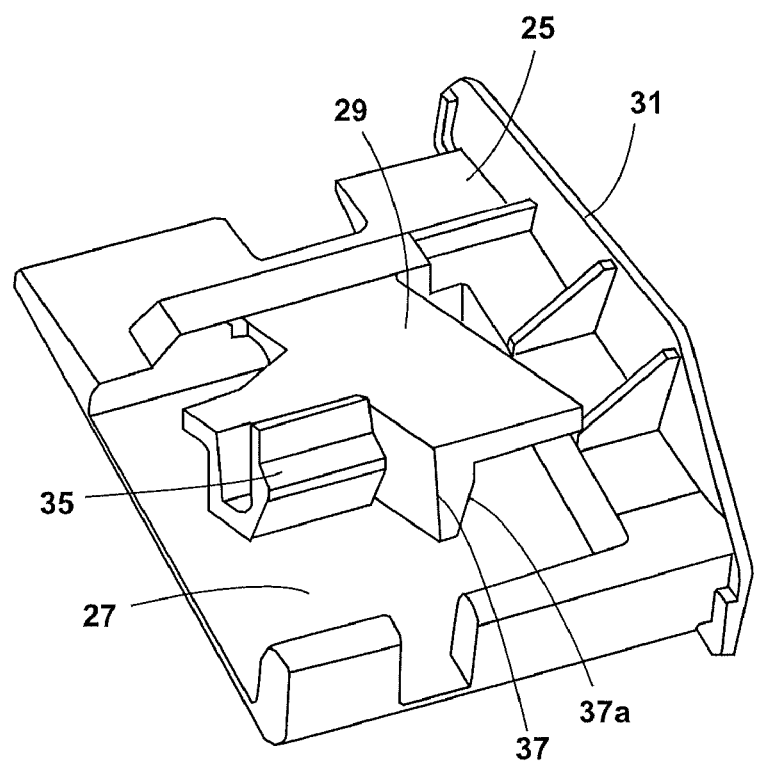
FIG. 4 is a perspective view of the end cap in FIG. 1 from another direction.
Figure 5:
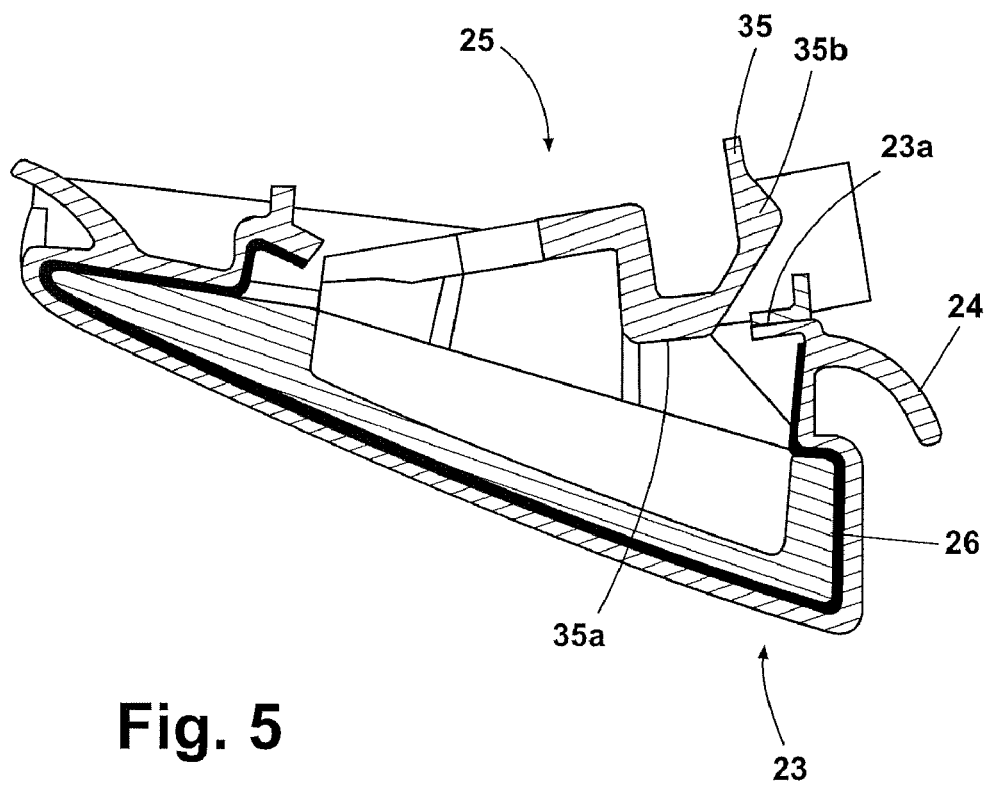
FIG. 5 is a cross-sectional view of FIG. 2 from section 5-5.
Figure 6:
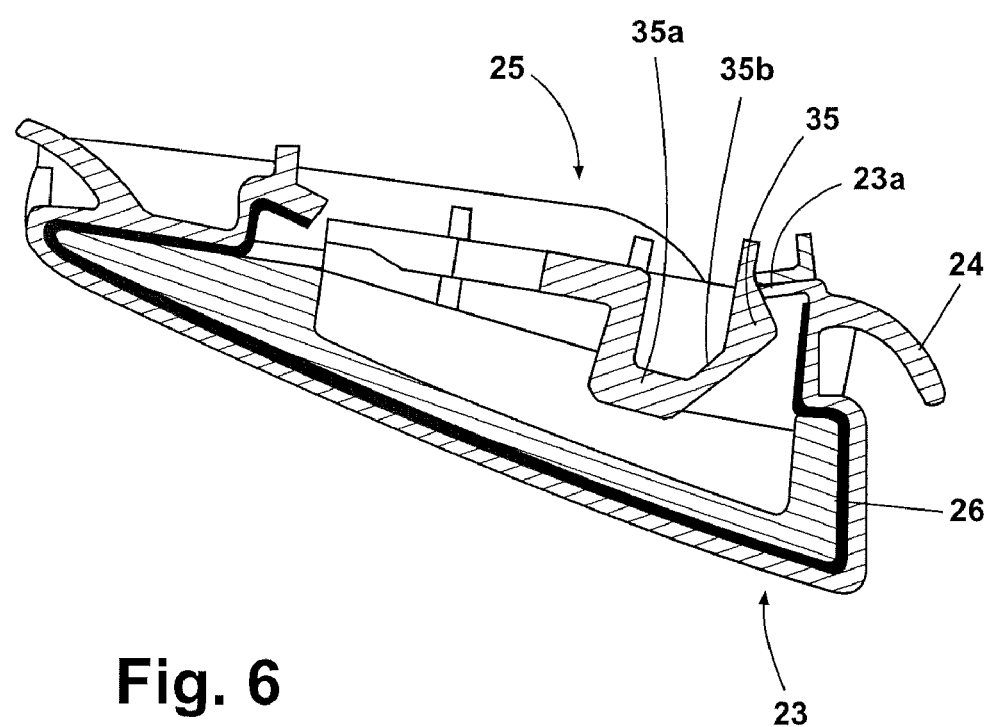
FIG. 6 is a cross-sectional view of FIG. 3 from section 6-6.

The following is an explanation of an embodiment of the present invention with reference to the drawings. FIG. 1 is a diagram of the overall configuration of the molding in which the end cap has not been assembled in the molding main unit. FIG. 2 is the diagram in FIG. 1 after the end cap main unit of the end cap has been inserted into the inner space of the molding main unit. FIG. 3 is the diagram in FIG. 2 after the engaging portion of the end cap movable portion of the end cap has engaged the engaged portion of the molding main unit. FIG. 4 is a perspective view of the end cap in FIG. 1 from another direction. FIG. 5 is a cross-sectional view of FIG. 2 from 5-5. FIG. 6 is a cross-sectional view of FIG. 3 from 6-6.

As shown in FIG. 1 through FIG. 3, the molding 21 consists of a molding main unit 23 and an end cap 25. The molding main unit 23 in this embodiment, as shown in FIG. 5 and FIG. 6, is extrusion-molded using a thermoplastic resin 24 to surround a core component 26 consisting of a roller-molded long thin plate of stainless steel. In a cross-sectional view from the direction perpendicular to the length of the molding main unit 23, there is an L-shaped curved portion (engaged portion) 23a at one end.

As shown in FIG. 1, an opening 23b is molded in the end surface of the molding main unit 23. The end cap 25 is inserted into the inner space from the opening 23b in the end surface of the molding main unit 23 to cover the end surface of the molding main unit 23.

A first protrusion 28 functioning as the first stopper is installed in the inner space of the molding main unit 23 so as to protrude in the direction perpendicular to the lengthwise direction of the molding main unit 23. The end cap 25 is manufactured using the resin molding method and consists, as shown in FIG. 1 and FIG. 4, of an end cap main unit 27 inserted into the inner space from the opening 23b in the end surface of the molding main unit 23 and an end cap movable portion 29 with a base end portion 29a installed rotatably in the end cap main unit 27. A cover portion 31 with a shape able to cover the opening 23b in the molding main unit 23 and make contact with the end surface of the molding main unit 23 is formed in the end cap 25.

As shown in FIG. 1 through FIG. 6, at the rotating end portion side of the end cap movable portion 29 is installed a catch portion 35 functioning as the engaging portion able to engage and disengage from the curved portion 23a functioning as the engaged portion of the molding main unit 23. The catch portion 35 is made from a material with elastic properties and a catch 35b with an inclined surface is formed in the end portion of the cantilever beam 35a. This allows the catch 35b to engage and disengage from the curved portion 23a in the molding main unit 23. A second protrusion 37 functioning as the second stopper portion is formed in the end cap movable portion 29. It is able to come into contact with the first protrusion 28 in the molding main unit 23 when the catch portion 35 engages the curved portion 23a. When the second protrusion 37 comes into contact with the first protrusion 28, it prevents movement in the direction removing the end cap 25 from the opening 23b in the molding main unit 23 (the direction of arrow C in FIG. 1 and FIG. 2). In this embodiment, as shown in FIG. 2 and FIG. 4, the surface of the second protrusion 37 coming into contact with the first protrusion 28 is an inclined surface 37a. This inclined surface 37a generates a component of force pulling the end cap 25 to the normal position lengthwise with respect to the molding main unit 23

(i.e., the position at which the cover portion 31 covers the opening 23b in the molding main unit 23 and makes contact with the end surface of the molding main unit 23) when the end cap 25 is inserted from the opening 23b in the molding main unit 23, the catch portion 35 (engaging portion) of the end cap movable portion 29 is rotated in the direction (i.e., the direction opposite the direction of arrow C in FIG. 1 and FIG. 2) engaging the curved portion (engaged portion) 23a of the molding main unit 23, and the inclined surface 37a on the second stopper portion 37 is pushed into the first stopper portion 28.

The following is an explanation with reference to FIG. 1 through FIG. 5 of the assembly method for a molding with this configuration. In FIG. 1, the end cap 25 has not been assembled with the molding main unit 23. From the state shown in FIG. 1, the end cap main unit 27 of the end cap 25 is inserted into the inner space of the molding main unit 23. The result is the state shown in FIG. 2. When the end cap movable portion 29 of the end cap 25 is rotated, and the catch portion 35 of the end cap movable portion 29 engages the curved portion 23a of the molding main unit 23, the second protrusion 37 on the end cap movable portion 29 makes contact with the first protrusion 28 on the molding main unit 23. In this embodiment, a component of force pulling the end cap 25 into the normal position is generated on the inclined surface 37a of the second protrusion 37. The end cap 25 is pulled in until the cover portion 31 covers the opening 23b in the molding main unit 23 and comes into contact with the end surface of the molding main unit 23.

When end cap 25 moves in the direction of removal from the molding main unit 23, the second protrusion 37 in the end cap movable portion 29 comes into contact with the first protrusion 28 in the molding main unit 23, and the end cap 25 is kept from moving any further in the removal direction from the molding main unit 23.

This configuration has the following effects:

(1) The end cap 25 can be kept from coming out of the molding main unit 23 simply by inserting the end cap main unit 27 from the opening 23b in the molding main unit 23 and engaging the catch portion 35 of the end cap movable portion 29 with the curved portion 23a of the molding main unit 23. As a result, equipment is not needed and assembly time can be reduced.

(2) The inclined surface 37a on the second protrusion 37 generates a component of force pulling the end cap 25 to the normal position lengthwise with respect to the molding main unit 23 (i.e., the position at which the cover portion 31 covers the opening 23b in the molding main unit 23 and makes contact with the end surface of the molding main unit 23) when the end cap 25 is inserted from the opening 23b in the molding main unit 23, the catch portion 35 (engaging portion) of the end cap movable portion 29 is rotated in the direction (i.e., the direction opposite the direction of arrow C in FIG. 1 and FIG. 2) engaging the curved portion 23a of the molding main unit 23, and the inclined surface 37a on the second stopper portion 37 is pushed into the first stopper portion 28. In this way, the end cap 25 can be pulled into the normal position lengthwise with respect to the molding main unit 23 simply by inserting the end cap main unit 27 from the opening 23b in the molding main unit 23 and rotating the catch portion 35 of the end cap movable portion 29 in the direction of engagement with the curved portion 23a of the molding main unit 23.

(3) A cover portion 31 is formed in the end cap 25 with a shape able to cover the opening 23b in the molding main unit 23 and make contact with the end surface of the molding main unit 23. This keeps the end cap 25 from being inserted any further into the inner space of the molding main unit 23. The second protrusion 37 on the end cap 25 comes into contact with the first protrusion 28 on the molding main unit 23 to position the end cap 25 in the removal direction from the molding main unit 23. The cover portion 31 of the end cap 25 comes into contact with the end surface of the molding main unit 23 to position the end cap 25 in the molding main unit 23 insertion direction. These components position the end cap 25 lengthwise with respect to the molding main unit 23.

The present invention is not limited to this embodiment. In this embodiment, the inclined surface pulling the end cap 25 into the regular position lengthwise with respect to the molding main unit 23 is formed in the second protrusion 37 on the end cap 25 side. However, it can also be formed on the first protrusion 28 in the molding main unit 23 or on both the first protrusion 28 and the second protrusion 37.

Also, the second protrusion and the catch portion can be integrally molded to reduce end cap 25 manufacturing costs. In addition, the first stopper portion is not limited to a protruding portion like the first protrusion 28 in this embodiment. The first stopper portion, for example, can be a recessed portion.

What is claimed is:

1. A molding, comprising:
   a molding main unit having:
     an opening in an end surface;
     a first stopper portion; and
     an engaged portion which together with the first stopper portion are positioned in the inner space of the main unit; and
   an end cap, including:
     an end cap main unit inserted into the inner space from the opening in the end surface;
     an elastically deflectable engaging portion integrally connected by a cantilever beam to a movable portion, the engaging portion able to engage and disengage from the engaged portion, with a base end portion rotatably installed in the end cap main unit and a rotating end portion side inserted into the inner space through the opening in the end surface; and
     an end cap movable portion from which a second stopper portion extends to prevent movement in a direction acting to remove the end cap from the opening in the molding main unit by contact of the second stopper portion with the first stopper portion when the engaging portion is engaged with the engaged portion.

2. The molding of claim 1, comprising an inclined surface formed on one of the first and second stopper portions operating to press against the other stopper portion, the inclined surface generating a component of force pulling the end cap into the inner space of the molding when:
   the end cap is inserted from the opening in the molding main unit;
   the engaging portion of the end cap movable portion is rotated in the direction engaging the engaged portion of the molding main unit; and
   the second stopper portion is received in the first stopper portion.

3. The molding of claim 1, further including a cover portion formed in the end cap having a shape able to cover the opening in the molding main unit and make contact with the end surface of the molding main unit.

4. The molding of claim 1, wherein the second stopper portion and the engaging portion in the end cap movable portion are homogenously formed.

5. A molding assembly, comprising:
   a polymeric molded first member including:

an end surface having an opening into an inner space of the first member;
a first protrusion; and
an L-shaped portion; and
a homogenously created end cap defining a polymeric molded second member partially slidably received in the inner space through the opening, the end cap including:
an end cap main unit received in the inner space; and
a movable portion including:
a base end portion rotatably connected to the end cap main unit;
an elastically deflectable catch portion having a cantilever beam and a catch created at an end of the cantilever beam able to engage and disengage from the L-shaped portion when the end cap main unit is received in the inner space;
a second protrusion operating to prevent movement in a direction acting to remove the end cap from the opening in the molding main unit by contact between the first protrusion and the second protrusion when the catch portion is engaged with the L-shaped portion; and
a cover portion operable to contact the end surface when the end cap main unit is received in the inner space.

6. The molding of claim 5, wherein the molding main unit further includes a curved portion adapted to receive the catch.

7. The molding of claim 5, wherein the second protrusion further includes an inclined surface operating to generate a component of force pulling the end cap lengthwise with respect to the first molded member until the end cap contacts the end surface of the first molded member.

8. The molding of claim 5, wherein the L-shaped portion is partially positioned in the inner space of the molding main unit.

9. The molding of claim 5, wherein the first stopper portion partially protrudes into the inner space in a direction perpendicular to a lengthwise direction of the molding main unit.

10. The molding of claim 5, further including a core component made of a metal plate embedded within the first member.

11. The molding of claim 5, wherein the first protrusion further includes an inclined surface, the inclined surface acting to pull the end cap lengthwise with respect to the first member by engagement with the second protrusion.

12. An automobile belt line molding assembly, comprising:
a molded first member including:
an end surface having an opening into an inner space of the first member;
a first protrusion;
an L-shaped portion; and
a metal plate embedded within a polymeric material of the first member; and
an end cap defining a molded second member partially slidably received in the inner space through the opening, the end cap including:
an end cap main unit received in the inner space;
an elastically deflectable catch portion able to deflect after the end cap main unit is received in the inner space, the catch portion including a cantilever beam and a catch created at an end of the cantilever beam, the catch able to engage and disengage from the L-shaped portion; and
a movable portion including:
a base end portion rotatably connected to the end cap main unit;
a second protrusion operating to prevent movement in a direction acting to remove the end cap from the opening in the first member by contact between the first protrusion and the second protrusion; and
a cover portion operable to contact the end surface when the end cap main unit is received in the inner space.

13. The automobile belt line molding assembly of claim 12, wherein the cantilever beam and the catch are created at an end portion side of the movable portion inserted into the inner space through the opening in the end surface.

14. The automobile belt line molding assembly of claim 12, wherein the movable portion is oriented to be rotatable in a direction transverse to a lengthwise direction of the first member.

15. A molding, comprising:
a molding main unit having a first protrusion and an L-shaped portion; and
an end cap, including:
an end cap main unit slidably inserted into an opening of the molding main unit;
an elastically deflectable catch portion integrally connected by a cantilever beam to a movable portion rotatably connected to the end cap main unit, the catch portion able to engage and disengage from the L-shaped portion; and
a second protrusion connected to the movable portion, the second protrusion preventing movement of the end cap in a direction acting to remove the end cap from the opening of the molding main unit by contact of the second protrusion with the first protrusion when the catch portion is engaged with the L-shaped portion.

* * * * *

UNITED STATES PATENT AND TRADEMARK OFFICE
CERTIFICATE OF CORRECTION

PATENT NO. : 7,785,686 B2
APPLICATION NO. : 11/877026
DATED : August 31, 2010
INVENTOR(S) : Katsuhisa Fukui et al.

It is certified that error appears in the above-identified patent and that said Letters Patent is hereby corrected as shown below:

Title Page, Item [73] Assignee, insert the following:

--Shiroki Corporation, Fujisawa-Shi, KGW, JAPAN--.

Signed and Sealed this
Nineteenth Day of April, 2011

David J. Kappos
*Director of the United States Patent and Trademark Office*